United States Patent [19]

Kashi et al.

[11] Patent Number: 4,797,738

[45] Date of Patent: Jan. 10, 1989

[54] COLOR RECOGNITION APPARATUS

[75] Inventors: Motofumi Kashi, Chofu; Hiroaki Shimoe, Hino, both of Japan

[73] Assignee: Kabushiki Kaisha Tohken, Tokyo, Japan

[21] Appl. No.: 50,038

[22] Filed: May 15, 1987

[30] Foreign Application Priority Data

May 19, 1986 [JP] Japan .................................. 61-114244
May 19, 1986 [JP] Japan .................................. 61-114245
Feb. 14, 1987 [JP] Japan .................................. 62-32167

[51] Int. Cl.$^4$ ............................................. H04N 7/18
[52] U.S. Cl. ...................................... 358/101; 358/30; 382/17; 364/526
[58] Field of Search ...................... 358/75, 80, 22, 101, 358/107; 356/402, 404, 406, 407; 364/526

[56] References Cited

U.S. PATENT DOCUMENTS

| | | | |
|---|---|---|---|
| 4,189,742 | 2/1980 | Klopsch | 358/80 |
| 4,535,413 | 8/1985 | Shiota et al. | 364/526 |
| 4,597,006 | 6/1986 | Orsburn | 358/54 X |
| 4,707,727 | 11/1987 | Penney | 358/30 X |
| 4,725,879 | 2/1988 | Eide et al. | 382/17 X |

Primary Examiner—Howard W. Britton
Assistant Examiner—Victor R. Kostak
Attorney, Agent, or Firm—Wenderoth, Lind & Ponack

[57] ABSTRACT

A color recognition apparatus according to the present invention is arranged so that assigned color differences and brightness signals are separated from a video signal, and these separated signals are determined according to the upper and lower limit values present in a decision circuit so as to output a binary signal, and signals of brightness, chroma and hue are separated from the video signal, and these separated signals are determined according to the limit values so that the hue is automatically determined to confirm it by the screen of a monitor, thereby eliminating individual differences and errors in recognition due to eyesight and being capable of recognizing the hue under a uniform condition and further determining the area of the object to be inspected.

11 Claims, 6 Drawing Sheets

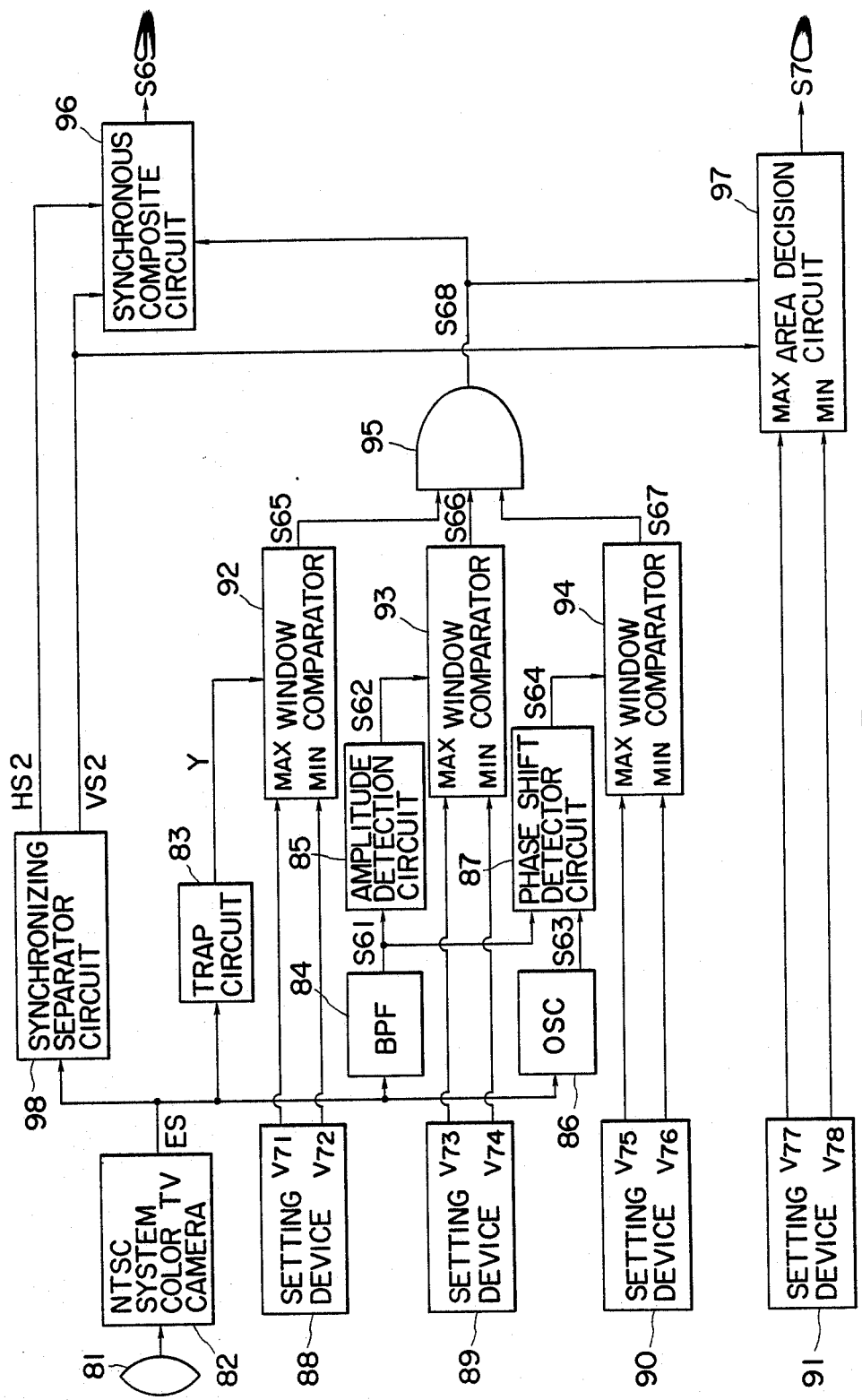
F I G. 5

COLOR RECOGNITION APPARATUS

BACKGROUND OF THE INVENTION

This invention relates to a color recognition apparatus for effectively confirming any color change of a product in a drug production line, an inspection line or the like, and to a process for automatic inspection of foreign matter contamination and of the configuration of such a product as well as for efficiently determining a color code printed on or attached to articles or goods such as a tire, an electric wire, a food package, and a resistor or the like.

It has heretofore been (customary) to check for color changes of products and to inspect whether foreign matter has been mixed therewith by means of a method employing the naked eye of an operator so as to ensure the quality of products in a drug production line, inspection line or the like. There are difficulties involved in such a visual inspection, however, since uniform color discrimination cannot be made and (the operator) may not be instantaneously aware of the presence of foreign matter to allow for the removal thereof due to individual differences.

There has been a well known black-and-white photographic apparatus that is adapted to obtain the video image of an object and then to picture process the video signal obtained from a picture treatment with the density of the video, that is, differences in lightness, thereby allowing a hue to be identified. An apparatus of this class is not capable of color discrimination when there is no difference in lightness even if the hue of the object is different.

For this reason, an optical filter corresponding to the color of the object is mounted on the black-and-white photographic apparatus so as to obtain a difference in density for the purpose of detecting a color. The problems arising from this type of apparatus are that much labor is required for treating the object if it has a multiplicity of colors, thus necessitating the adjustment of the optical filter each time.

A form of color recognition which is performed using of a color photographic apparatus has also been well known. This requires color separation in which a color is separated into the three primary colors such as red (R), green (G) and blue (B) and performs a mutual operation for the respective color compositions to obtain color recognition, thereby departing from (the need for) a sensual decision on the basic of vision. This also requires much labor for color correction each time in the color photographic apparatus. In addition, the (need for a) transmission path for each color composition requires three systems and thus the apparatus is complicated and very costly. It would be desirable to solve these problems.

In these days, various articles such as electrical wire, food packages, and resistors have a multi-colored marking line (stripe, circle, etc.,) printed or attached thereto, this being known as a color code. These colored marking lines are different from each other according to the type, grade and the like of the product. In other words, the type, grade and the like of the product may be discerned by identifying the order or arrangement of hues which form these marking lines.

A well known type of hue detection apparatus for such marking lines and the like employs a color separation light receptive element as disclosed in Japanese Laid-open Patent Application Nos. 80018/1986 and 80019/1986. A chroma detection apparatus of the disclosed type is limited to hue detection of only a small part of the hue location of the object whose hue is to be detected. This type of hue detection apparatus therefore requires the movement of the object whenever the order or arrangement of hues successively disposed in the form of marking lines is detected so that the portion to be hue detected may be scanned. This requires much time for recognizing the hue of the marking line and leads to shortcomings in that the hue is not determined and processed at high speed. It is thus eagerly hoped that this (problem) can be solved.

SUMMARY OF THE INVENTION

The present invention has been provided after giving due consideration to the aforementioned circumstances.

It is an object of the present invention to provide a color recognition apparatus wherein a color difference signal is separated from a brightness signal by a signal representing a video image photographed by means of a color television camera or the like, and wherein a determination is made as to whether or not these signals fall within a predetermined region, and wherein a binary signal is outputted under the condition that all the signals fall within the predetermined region so that a binary (black and white) signal of the assigned specific hue may be obtained so as to allow the hue to be automatically recognized, the binary image signal thus outputted being subjected to image processing by means of an image processing computer, whereby the order or arrangement of the marking lines for each hue may be determined at a high speed.

According to one aspect of this invention, for achieving the objects described above, there is provided a color recognition apparatus wherein the picture of an assigned color is picked up from NTSC system composite color video signals photographed by a color photographic apparatus, thereby determining a color, wherein signal components of brightness, chroma and hue are separated from said composite color video signal, and wherein a decision output means is provided to determine whether or not said signal components of brightness, chroma and hue fall within ranges of preset upper and lower limit values, and wherein a binary signal is outputted provided that all of the signal components of brightness, chroma and hue are in their respective set ranges.

According to another aspect of this invention, there is provided a color recognition apparatus wherein a picture of hue in assigned order or arrangement is picked up from a video signal photographed by a photographic apparatus, thereby determining a color code wherein a color difference signal and a brightness signal are separated from said video signal, and wherein color pick-up means are provided for every color for picking up specific hue information to determine whether or not said color difference and brightness signals fall within ranges of upper and lower limit values preset by said color pick-up means, and wherein a binary picture signal is outputted from each of a plurality of said color pick-up means to process the picture provided that said color difference and brightness signals fall within set ranges of said color pick-up means.

The nature, principle and utility of this invention will become more apparent from the following description when read in conjunction with the accompanying drawings.

BRIEF DESCRIPTION OF THE DRAWINGS

In the accompanying drawings:

FIG. 5 is a block diagram of a color recognition apparatus in accordance with another embodiment of the present invention.

DESCRIPTION OF THE PREFERRED EMBODIMENTS

Figure 1:
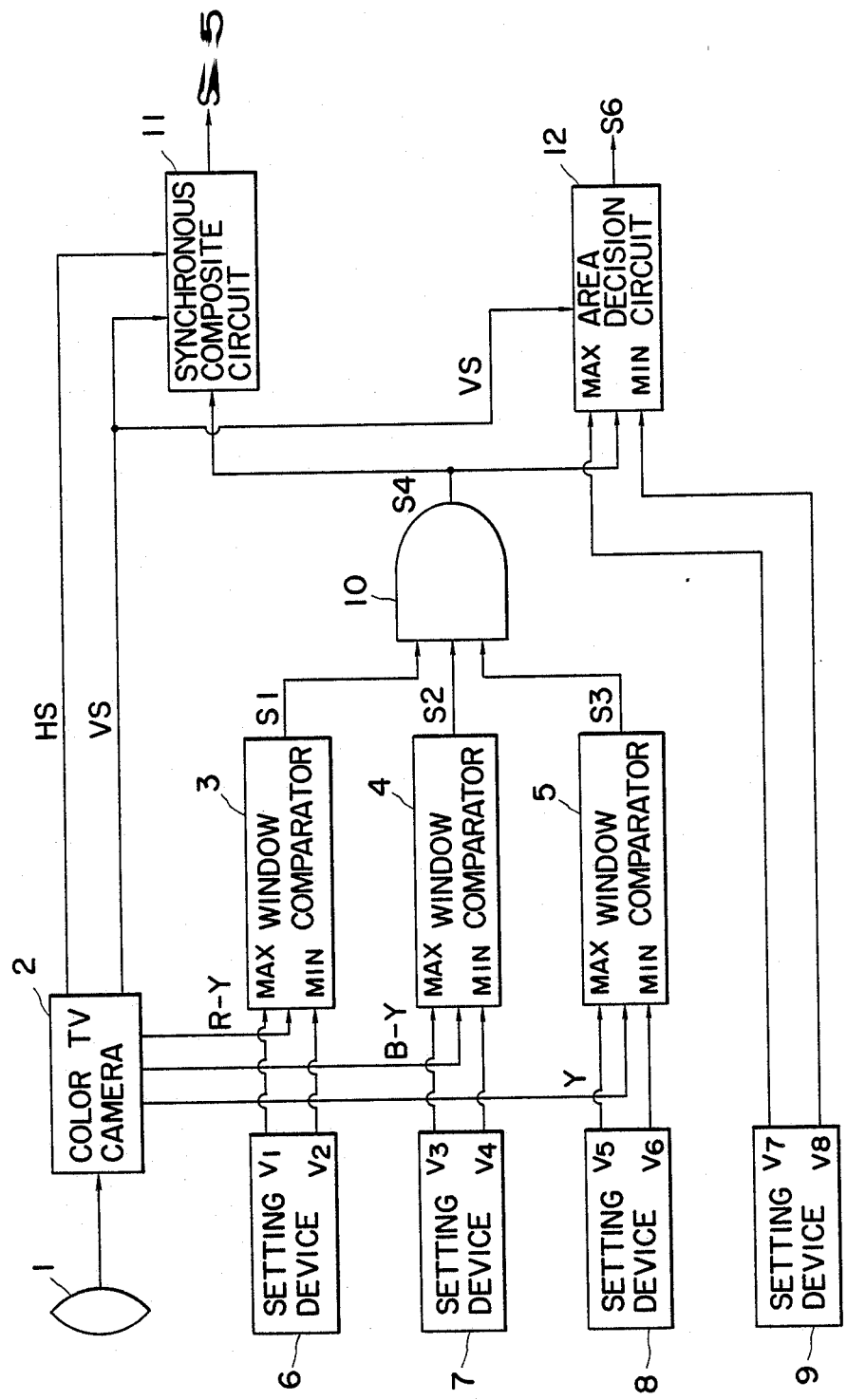
FIG. 1 is a block diagram of a color recognition apparatus in accordance with one embodiment of the present invention.

FIG. 1 is a block diagram showing one embodiment of a color recognition apparatus of the present invention. The color recognition apparatus is adapted for provision in a production line or inspection line and is in use. The color recognition apparatus comprises a lens 1 for bringing the object to be inspected into focus with a desired magnification in order to photograph graph the object; a color television camera 2 for converting the image of the object to be inspected as photographed into a color video signal and for separating the color video signal into a brightness signal Y, a color difference signal (R−Y) between a red signal R and the brightness signal Y, another color difference signal (B−Y) between a blue signal B and the brightness signal Y, a horizontal synchronizing signal HS, and a vertical synchronizing signal VS in order to output these signals; a first setting device 6 for inputting the maximum and minimum values $V_1$ and $V_2$ of a set voltage to a window comparator 3; a second setting device 7 for inputting the maximum and minimum values $V_3$ and $V_4$ of a set voltage to a second window comparator 4; and a third setting device 8 for inputting the maximum and minimum values $V_5$ and $V_6$ of a set voltage to a third window comparator 5. In this instance, the window comparator 3 generates an analog color difference signal (R−Y) and a binary color difference signal S1 by set voltages $V_1 V_2$. The window comparator 4 is adapted to generate an analog color difference signal S2 from the analog color difference signal (B−Y) and set voltages $V_3$ and $V_4$. The window comparator 5 is adapted to generate a binary brightness signal S3 from the analog brightness signal (Y) and set voltage $V_5$ and $V_6$.

The binary color difference signals S1 and S2 and the binary brightness signal S3 as generated in the aforementioned manner are inputted to an AND circuit 10 which is adapted to output a control signal S4 when the set ranges of the respective signals are correct. The horizontal synchronizing signal HS and vertical synchronizing signal VS from the color television camera 2 are inputted to a synchronous composite circuit 11. These hue signals are synchronously combined to generate a black-and-white video output signal S5 for one frame when the control signal S4 is inputted from the AND circuit 10. This black-and-white video output signal S5 is picture processed by means of a picture processing circuit (not shown) so as to display the picture in black-and-white of a hue assigned by the setting devices 6 to 8 on the screen of a black-and-white television monitor. The color recognition apparatus is provided with a setting device 9 for inputting the maximum and minimum values $V_7$ and $V_8$ of set voltages to an area decision circuit 12 for the purpose of assigning the dimensions of the object to be inspected, and the area decision circuit 12 into which set voltages $V_7$ and $V_8$ and the vertical synchronizing signal VS are inputted and which is adapted to output a decision signal S6 when the control signal S4 is inputted from the AND circuit 10. The decision signal S6 is inputted to a control circuit so as to determine the dimensions of the object to be inspected which is displayed on the screen of the black-and-white television monitor and to give an alarm or the like if foreign matter of more than a predetermined size is (found to be) mixed therein.

Figure 2:
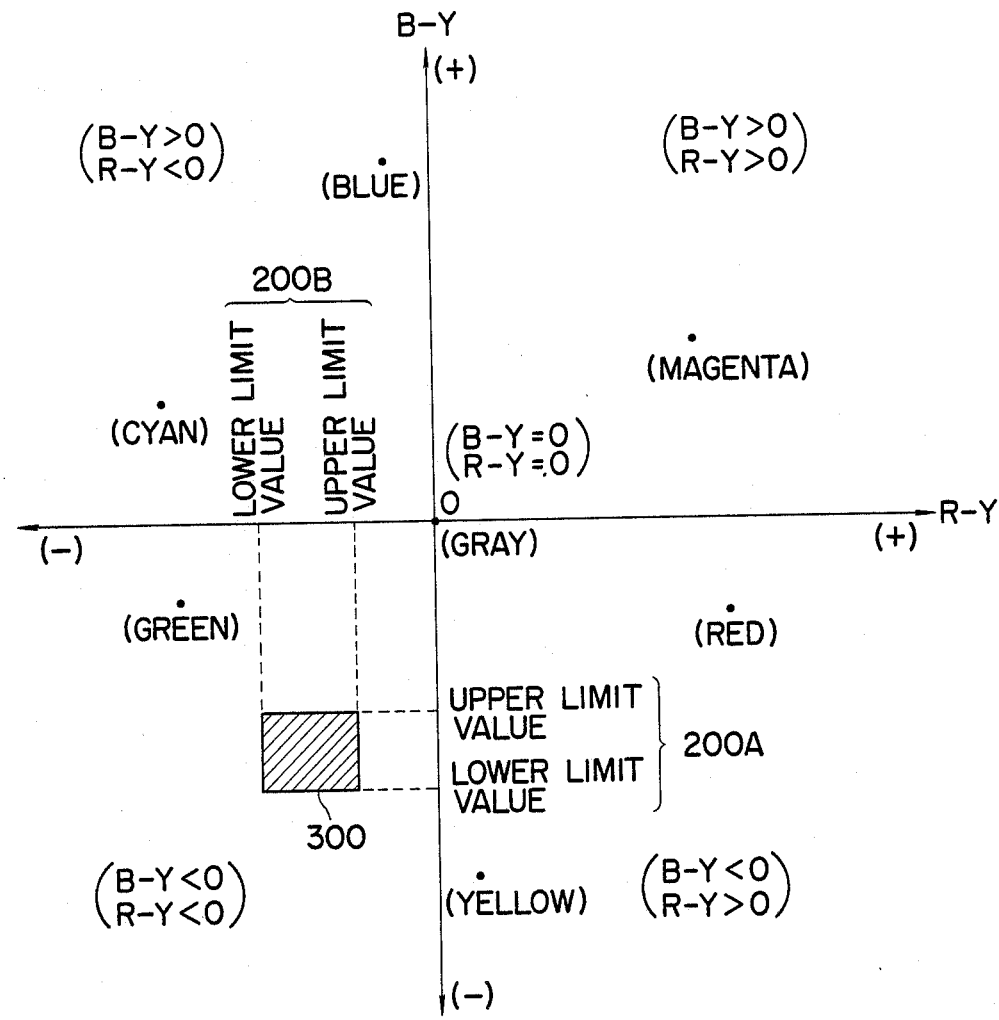
FIG. 2 is a graph showing the mutual relationship of hues representative of a color difference signal (B−Y) and a brightness signal (Y)

FIG. 2 shows the interrelationship of hues represented by the analog color difference signals (B−Y) and (R−Y) and the brightness signal (Y) outputted from the color television camera 2. The color recognition apparatus according to the present invention is so arranged that the hue of the object to be inspected that is photographed by the color television camera 2 is expressed by a combination of the analog color difference signals (B−Y) and (R−Y). FIG. 2 also shows the situation when the hues are successively expressed in a region in which four conditions are combined. As shown, there are instances where magenta is obtained when the analog color difference signal is (B−Y>0, R−Y>0), when red and yellow are given when the analog color difference signal is (B−Y<0, R−Y>0), where blue and cyan are obtained when the analog color difference signal is (B−Y>0, R−Y<0), where green is given when the analog color difference signal is (B−Y<0, R−Y<0), and where gray is obtained when the analog color difference signal is (R−Y=0, R−Y=0). In this connection, for instance, for designation of a hue 300, the set voltages $V_1$ through $V_6$ are set by the setting devices 6 to 8 for assigning the upper and lower limit values 200A of the analog color difference signal (B−Y) and the upper and lower limit values 200B of the analog color difference signal (R+Y), and the upper and lower limit values (not shown) of the brightness signal (Y). It is to be noted that assignment of these hues and comparison of the comparators may be made in a digital manner.

The manner of use of this color recognition apparatus will now be explained. First, the operator or user adjusts the lens 1 of the color television camera so as to prepare for photographing the object to be inspected which is being conveyed along the production and inspection lines. As mentioned above, the hue of the object to be inspected is previously set by setting the set voltages $V_1$ through $V_6$ of the setting devices 6 to 8. In this manner, when the object to be inspected is conveyed to a photographing position of the color television camera 2 with the hue designation accordingly, the object to be inspected is photographed by the color television camera 2 for its video (function) to separate the brightness signal (Y), color difference signals (B−Y) and (R−Y), the horizontal synchronizing signal HS, and the vertical synchronizing signal VS, and inputting these signals to the comparators 3 to 5 and the synchronous composite circuit 11. It is to be noted that since the hue is previously assigned by the setting devices 6 to 8, the object to be inspected which is of the same hue as the assigned hue is photographed, and the brightness signal (Y), and the color difference signals (B−Y) and (R−Y) are inputted to the window comparators 3 to 5 so that the binary color difference signals S1 and S2 and the binary brightness signal S3 are generated whereby these signals are inputted to the AND circuit 10. At this moment, the set ranges of the respective signals correspond to each other so that the control signal S4 is inputted to the synchronous composite circuit 11. The black-and-white video output signal S5 is generated corresponding to the hue in the aforementioned manner and is then processed by the video processing circuit, the video of the assigned hue being thereby displayed in black and white on the screen of the black-and-white television monitor.

Now, when the dimensions (area) of the object to be inspected are assigned so as to determine the dimensions of any foreign matter mixed therewith, the dimensions of tolerance of the object to be inspected are assigned by the set, voltages $V_7$ and $V_8$, and an alarm or the like is given when the decision signal S6 is generated and inputted to the control circuit when foreign matter occupying more than the assigned area is being conveyed. In this manner, the user is able to carry on product inspection of the object to be inspected by (watching) the screen of the black-and-white television monitor and (responding to any) alarm or the like.

Although an instance where the object to be inspected is photographed by a color television camera has been described, a photographic apparatus such as a charge coupled device (CCD) camera may also be employed.

Figure 3:
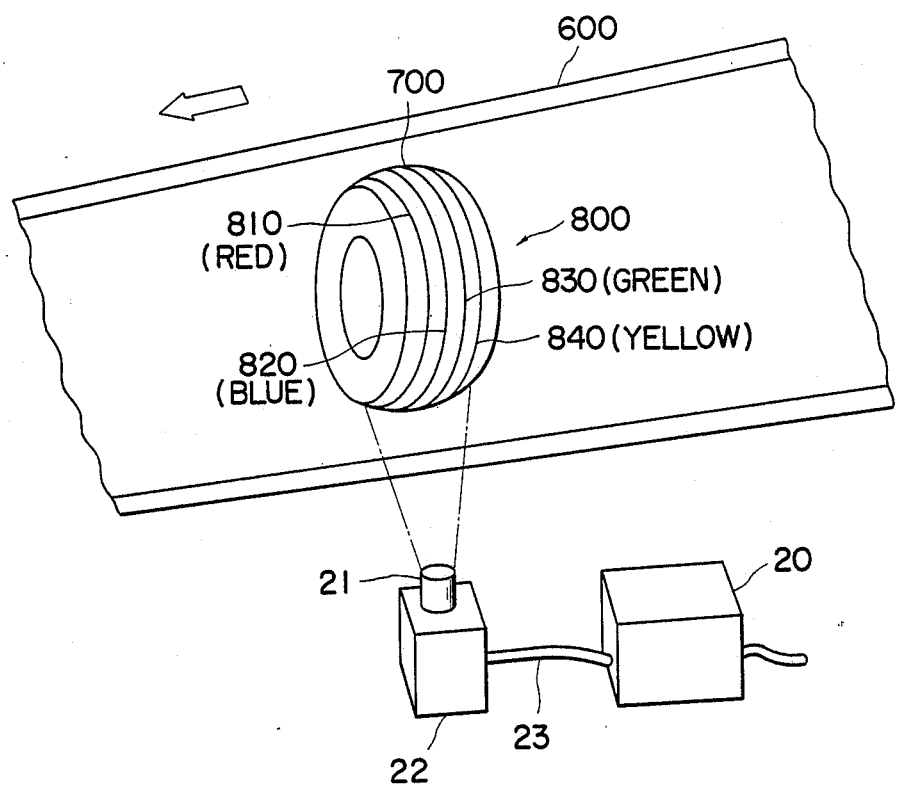
FIG. 3 is a view showing an applied example of a color code mination apparatus in which the invention is embodied.

FIG. 3 shows one embodiment in which the color recognition apparatus of the present invention is applied to a color code determining apparatus which is used in production and inspection lines in a tire manufacturing plant.

In these production and inspection lines, a tire 700 is adapted to be conveyed by a belt conveyor 600 in the direction of the arrow as shown. A color code 800 in printed on the periphery of the tire 700 for determining the type and grade of the tire 700. The color code 800 consists of marking lines 810 (red), 820 (blue), 830 (green), and 840 (yellow). The color code determining apparatus is mounted in position downwardly of the belt conveyor 600. The color code determining apparatus comprises a color television camera 22 which is provided with a lens 21 for bringing the color code 800 printed on the tire 700 into focus at a desired magnification for photography and a main body of the determining apparatus 20 connected to the color television camera 22 by way of a cable 23. The color code 800 on the tire 700 which has been conveyed by the belt conveyor 600 is photographed by the color television camera 22 and is inputted to the main body 20, and is then video processed. In this manner, the type and grade of the tire 700 are determined by the order of the hues of the marking lines 810 to 840 of the color code 800.

Figure 4:
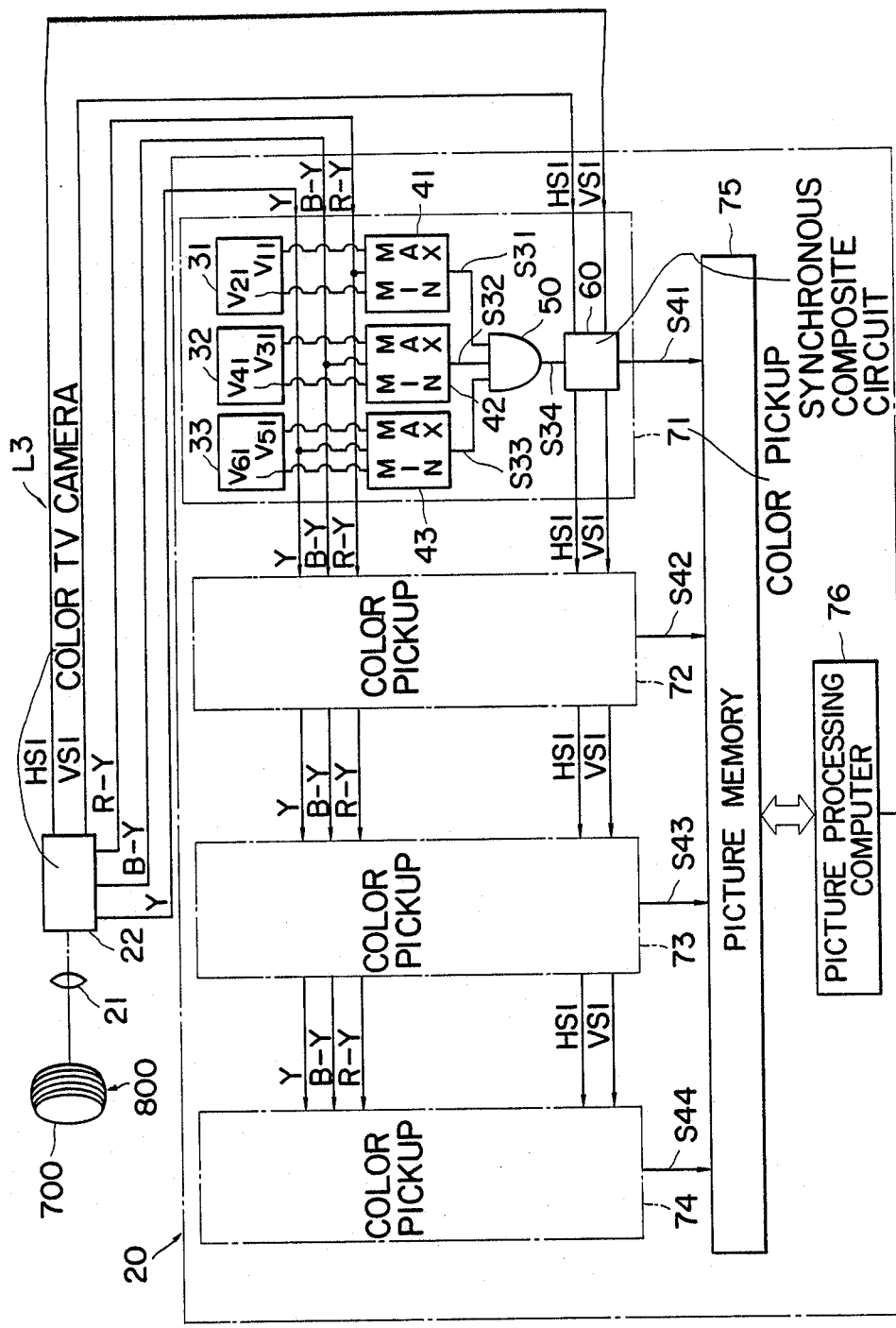
FIG. 4 is a block diagram showing a circuit arrangement for a color code determination apparatus.

FIG. 4 is a block diagram showing one form of a circuit arrangement of a color code determining apparatus. The color television camera 22 is actuated to convert the picture of the color code 800 photographed as aforementioned to the color video signal and to then separate a color video signal into a brightness signal Y, a color difference signal (R−Y) between a red signal R and a brightness signal Y , a color difference signal (B−Y) between a blue signal B and a brightness signal Y, a horizontal synchronizing signal HS1, and a vertical synchronizing signal VS1 for inputting these signals. The main body 20 of the apparatus comprises color pick-up means 71 to 74 for electrically picking up information on each of the hues of the marking lines preassigned so as to output binary video signals S41 to S44, a picture memory 75 for storing the binary picture signals S41 to S44 as picture data, and a picture processing computer 76 for reading out the picture data stored in the picture memory 75 so as to compare the data with the order or arrangement of the hues of the preassigned marking lines to determine the data, so as to thereby output a determining signal S50.

Now, the color pick-up means 71 to 74 will be detailed. Since each pick-up means is identical, it is deemed sufficient to describe only one, that is, the pick-up means 71.

The color pick-up means 71 is provided therein with a setting device 31 for inputting the maximum and minimum values $V_{11}$ and $V_{21}$ of the set voltages to a window comparator 41, a second setting device 32 for inputting the maximum and minimum values $V_{31}$ and $V_{41}$ of the set voltages to a second window comparator 42, and a third setting device 33 for inputting the maximum and minimum values $V_{51}$ and $V_{61}$ of the set voltages to a third window comparator 43. It is noted that the first window comparator 41 is adapted to produce a binary color difference signal S31 from the analog color difference signal (R−Y) and the set voltages $V_{11}$ and $V_{21}$, and that the second window comparator 42 is adapted to generate a binary color difference signal S32 from the analog color difference signal (B−Y) and the set voltages $V_{31}$ and $V_{41}$, and that the third comparator 43 is adapted to produce a binary brightness signal S33 from the analog brightness signal (Y) and the set voltages $V_{51}$ and $V_{61}$.

The binary color difference signals S31 and S32 and the binary brightness signal S33 as generated in the aforementioned manner are inputted to an "AND" circuit 50 so as to output a control circuit S34 when set ranges of the respective signals are correct . The horizontal and vertical synchronizing signals HS1 and VS1 from the color television camera 22 are inputted to a synchronous composite circuit 60 which is adapted to synchronously combine these signals when the control signal S34 from the "AND" circuit 50 is inputted, thus producing a binary video signal S41.

How to use the color code discriminating apparatus will be explained. The user or operator initially adjusts the lens 21 of the color television camera 22 to prepare for photographing the color code 800 on the tire 700 conveyed by the belt conveyor 600 in the production and insepction lines. The hues of the marking lines 810 to 840 as the color code 800 are set by setting the set voltages of the setting device disposed on each of the color pick-up means 71 to 74. For instance, red, blue, green and yellow of the marking lines 810, 820, 830 and 840 are assigned to the color pick-up means 71, 72, 73 and 74, respectively. On the other hand, the hues of the marking lines 810 to 840 are set in the order of colors such as red, blue, green and yellow to the picture processing computer 76. Then, in this manner, the videoimages of the color code 800 of the tire 700 are photographed so as to separate the signals into the brightness, color difference signals (Y), (B−Y) and (R−Y), and horizontal and vertical synchronizing signals HS1 and VS1, thereby inputting these signals to the respective color pick-up means 71 to 74 when the tire 700 is conveyed to a position in which it is of photographed by the color television camera 22.

In this connection, it is noted that since the hues are assigned to the setting devices of the color pick-up means 71 to 74, the binary color difference signal and the binary brightness signal are generated and inputted to the "AND" circuit when the brightness signal (Y) and the color difference signals (B−Y) and (R−Y) of the marking lines 810 to 840 are inputted to the comparators, and the control signal is in turn inputted to the synchronous composite circuit when the set ranges of the respective signals correspond to each other. In the manner as aforementioned, the binary picture signals S41 to S44 which correspond to the hues of the marking lines 810 to 840 are generated from the color pick-up means 71 to 74 and once stored as the video data in the picture memory 75. These video signals S41 to S44 are then inputted to the picture processing computer 76 so as to determine the order (red, blue, green and yellow) of the hues of the marking lines 810 to 840 as above set, thereby outputting the determining signal S50. Now, a control device and the like is connected to the output side of the main body 26 to readily determine the quality, grade and the like of the tire 700.

Although the invention has been described with reference to the instance where the object to be inspected is photographed by a color television camera, it is apparent that this may be done by the use of a photographic apparatus such as a charge coupled device (CCD) camera. The number of the color pick-up means may be increased depending upon the varieties of the hues of the color codes. Although the invention has been described with reference to the tire as the object to be inspected, it is obvious that the color codes printed on or attached to all products such as a wire, food packages, and resistors and the like may be determined by the use of the color code determined apparatus.

FIG. 5 is a block diagram showing another embodiment of the color recognition apparatus according to the invention. The color recognition apparatus is mounted in a production line an inspection line and the like for use therein and comprises a lens 81 for bring the object to be inspected into focus at a desired magnification to photograph the object, an NTSC system color television camera 82 for outputting a composite color video signal ES of the picture of the object to be inspected as photographed, and a synchronizing separator circuit 98 for separating the composite color video signal ES into a horizontal synchronizing signal HS2 and a vertical synchronizing signal VS2 to output the same. The color recognition apparatus further comprises a trap circuit 83 for eliminating a component of a chrominance signal included in the composite color video signal ES to separate the brightness signal Y, a bandpass filter circuit 84 for separating only a chrominance signal component S61 from the composite color video signal ES, an amplitude detection circuit 85 for separating only an amplitude component S62 of the chrominance signal component S61 from the band-pass filter circuit 84, a synchronous oscillator circuit 86 for oscillating synchronously with a burst signal contained within the composite color video signal ES so as to reproduce a subcarrier S63, and a phase shift detector circuit 87 for detecting a phase difference in the chrominance signal component S61 from the band-pass filter circuit 84 as referenced from the subcarrier S63 so that a signal S64 corresponding to the hue may be detected.

A setting device 88 is provided for inputting the maximum and minimum values $V_{71}$ and $V_{72}$ of set voltages to a window comparator 92, a setting device 89 for inputting the maximum and minimum values $V_{73}$ and $V_{74}$ of set voltages to a window comparator 83, and a setting device 90 for inputting the maximum and minimum values $V_{75}$ and $V_{76}$ of set voltages to a window comparator 94. In this instance, it is noted that the window comparator 92 is adapted to generate a binary brightness signal component S65 from the brightness signal Y and the set voltage $V_{71}$ and $V_{72}$, and that the window comparator 93 is adapted to generate a binary chroma signal component S66 from the amplitude component S62 and the set voltages $V_{73}$ and $V_{74}$, and that the window comparator 94 is adapted to produce a binary hue signal component S67 from the signal corresponding to the hue and the set voltages $V_{75}$ and $V_{76}$. The binary chroma signal component S66 and the binary hue signal component S67 as generated in the aforementioned manner are input to an "AND" circuit 95 which is adapted to output a control signal S68 when the set ranges of the respective signals are correct.

The color recognition apparatus is provided with a synchronous composite circuit 96 for synchronously combining the horizontal and vertical synchronous signals HS2 and VS2 to genrate a black-and-white and video output signal S69 for one frame when these synchronous signals from the synchronizing separator circuit 98 and then the control signal S68 are inputted. The black-and-white video output signal S69 is picture processed by a picture processing circuit (not shown) to display on the screen of the black-and-white television monitor the picture in black-and-white of a color of the object to be inspected, as assigned by the setting devices 68 to 90.

The color recognition apparatus further includes a setting device 91 for inputting the maximum and minimum values $V_{77}$ and $V_{78}$ of set voltages to an area decision circuit 97 for the purpose of assigning dimensions of the object to be inspected, and the area decision circuit 97 to which the set voltages $V_{77}$ and $V_{78}$ and the vertical synchronizing signal VS2 are inputted and which is adapted to output a decision signal S70 when the control signal S68 is inputted from the "AND" circuit 95. The area decision circuit is adapted to input the decision signal S70 to a control circuit (not shown) to make a decision of the dimensions of the object to be inspected, which is to be displayed in the screen of the black-and-white television monitor, thereby giving an alarm or the like when foreign matter of dimensions more than those as predetermined are mixed therein.

Figure 6:
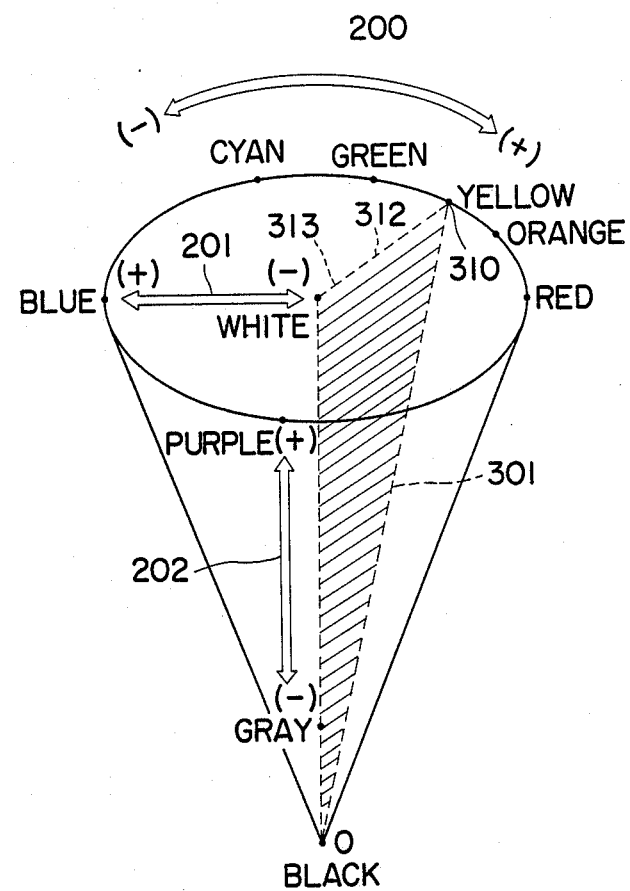
FIG. 6 is a graphic presentation showing the interrelationship of attributes such as hue, chroma and brightness in the color recognition apparatus of the present invention.

FIG. 6 is a graphic presentation showing an interrelationship between three attributes such as a hue, chroma and brightness obtained by the color recognition apparatus of the present invention. The color recognition apparatus according to the present invention is intended to express any color of the object to be inspected, which is photographed by the television camera 2 by the combination of the hue with chroma and brightness. In other words, the colors may be determined in a manner likely to be most similar to human eyesight. As shown, the colors such as red, orange, yellow, green, cyan, blue and purple are clockwise juxtaposed on the circumference of a circle with white as the center of a circle in the order of wavelength. All the hues as well as the lightest color of different chroma are represented on the circumference. An arrow 200 is shown as indicative of the hue of wavelength which is rightward (+) longer but leftrward (−) shorter. A further arrow 201 is shown as indicative of chroma which is rightward (+) higher but leftward (−) lower. Another arrow 202 is shown as representative of brightness which is high when brightness is high (+) and which is gray when brightness is low (−) but black when brightness is zero. Now, variations in brightness are represented in the axis of the ordinate to obtain a cone, as shown, with a disc indicative of brightness as the base and with black as the apex. All the colors are contained in the cone. For instance, a color 301 comprises all the lightest yellows with different chroma, which are arranged in such a manner that the clearest yellow 310, whitely yellow 312, and yellowish white 313 are lined up on yellow and white line. Variations in brightness of these colors are shown as being positioned in any of points on a triangle encompassed by white, black and yellow. When these colors are designed, the color recognition apparatus is designed to set brightness by the set voltages $V_{71}$ and $V_{72}$ of the setting device 88, chroma by the set voltages $V_{73}$ and $V_{74}$ of the setting device 89, and hue by the set voltages $V_{75}$ and $V_{76}$ of the setting device 90.

It is noted that assignment of these colors and comparison of the window comparators may be made digitally.

The manner in which the color recognition apparatus will be explained hereinafter. The user or operator initially adjusts the lens 81 of the color television camera 82 to prepare for photographing the object to be inspected conveyed to the production line, the inspection line and the like. Then, the color of the object to be inspected is assigned by setting the set voltages $V_{71}$ to $V_{76}$ of the setting devices 88 to 90 in the manner as aforementioned. The video image of the object to be inspected when it is conveyed with the color designated accordingly, is photographed by the color television camera to thus make the composite color video signal ES, the horizontal synchronizing signal VS2 separable so that the composite color video signal ES is inputted to the trap circuit 83 to render the brightness signal Y separable. The composite color video signal ES is separated by the band-pass filter circuit 84 as the chrominance signal component S61, making the amplitude component S62 separable by the amplitude detection circuit 85. The composite color video signal ES is reproduced as the subcarrier S63 by means of the synchronous oscillation circuit 86. The subcarrier S63 and the chrominance signal component S61 are detected by the phase shift detector circuit 87 as the signal S64 corresponding to the hue. Now, the brightness signal Y, the amplitude component S62, and the signal S64 corresponding to the hue are inputted to the respective window comparators 92 to 94. It is to be noted that since assignment of the color is set by the setting devices 88 to 90, the object to be inspected which is of the same color as the assigned color is photographed, and the brightness signal Y, the amplitude component S62 and the signal S64 corresponding to the hue are inputted to the window comparators 92 to 94 so that the signal component S65 of binary brightness, the signal component S66 of binary chroma, and the signal component S67 of binary hue are generated from the window comparators 92 to 94 and inputted to the AND circuit 95. At this moment, the set ranges of the respective signal component S65 to S67 are correct so that the control signal S68 is inputted to the synchronous composite circuit 96. On the other hand, since the horizontal and vertical synchronizing signals HS2 and VS2 are inputted to the synchronous composite circuit 96 in the manner as aforementioned, these signals are combined to generate the binary black-and-white video output signal S69 which is processed by the picture processing circuit, and the picture of assigned color is displayed in black-and-white on the screen of the black-and-white television monitor.

Now, when the dimensions (area) of the object to be ispected are assigned so as to determine the dimensions of any foreign matter mixed therewith, the dimensions of tolerance of the object to be inspected are assigned by the set voltages $V_{77}$ and $V_{78}$, and an alarm or the like is given if the decision signal S60 is generated and inputted to the control circuit when foreign matter occupying more than the assigned area is being conveyed.

In this manner, the user is able to carry on product inspection of the object to be inspected by (watching) the screen of the black-and-white black television monitor and responding to any alarm or the like.

Although an instance where the object to be inspected is photographed by a color television camera has been described, a photographic apparatus such as the CCD camera may also be employed. A window may be set for display made by a display apparatus to limit or modify a region to be displayed.

It should be understood that many modifications and adaptations of the invention will become apparent to those skilled in the art and it is intended to encompass such obvious modifications and changes in the scope of the claims appended hereto.

What is claimed is:

1. A color recognition apparatus wherein the picture of an assigned color is picked up from NTSC system composite color video signals photographed by a color pick-up apparatus, thereby determining color wherein signal components of brightness, chroma and hue are separated from said composite color video signal, and a decision output means is provided to determine whether or not said signal components of brightness, chroma and hue fall within respective ranges of preset upper and lower limit values, wherein a binary signal is outputted if all of said signal components of brightness, chroma and hue are in their respective set ranges; and wherein horizontal and vertical synchronizing signals are separated from said composite color video signal, an area decision means being provided to determine whether or not said synchronizing signals fall within ranges of present upper and lower limit values, a binary signal being outputted if said synchronizing signals fall within their respective set ranges.

2. A color recognition apparatus according to claim 1, wherein said color pick-up apparatus is a color television camera.

3. A color recognition apparatus according to claim 1, wherein said color pick-up apparatus is a CCD camera.

4. A color recognition apparatus wherein a picture of hue in an assigned order or arrangement is picked up from a video signal photographed by a pick-up apparatus, thereby determining color codes wherein a color difference signal and a brightness signal are separated from said video signal, and color pick-up means are provided for every color for picking up specific hue information to determine whether or not said color difference and brightness signals fall within ranges of upper and lower limit values present by said color pick-up means, and wherein a binary picture signal is outputted from each of a plurality of said color pick-up means to process the picture if said color difference and brightness signals fall within set ranges of said color pick-up means.

5. A color recognition apparatus according to claim 4, wherein said picture is processed by a computer.

6. A color recognition apparatus according to claim 4, wherein said pick-up apparatus is a color television camera.

7. A color recognition apparatus according to claim 4, wherein said color pick-up apparatus is a CCD camera.

8. A color recognition apparatus according to claim 4, wherein said color difference signal is a difference between red and said brightness signals and a difference between blue and said brightness signals.

9. A color recognition apparatus wherein the picture of an assigned hue is picked up from video signals photographed by a pick-up apparatus, thereby determining color wherein a difference signal and a brightness signal are separated from said video signal, and a decision output means is provided to determine whether or not said difference signal and brightness signal fall within respective ranges of preset upper and lower limit values, wherein a binary signal is outputted if the difference signal and brightness signal are in their respective set ranges; and wherein horizontal and vertical synchronizing signals are separated from said video signal, an area decision means being provided to determine whether or not said synchronizing signals fall within ranges of preset upper and lower limit value, wherein a binary signal is outputted if said synchronizing signal fall within their respective set range.

10. A color recognition apparatus according to claim 9, wherein said pick-up apparatus is a color television camera.

11. A color discriminating apparatus according to claim 9, wherein said pick-up apparatus is a CCD camera.

* * * * *